No. 734,084. PATENTED JULY 21, 1903.
C. J. OLLAGNIER.
AUTOMOTOR CARRIAGE.
APPLICATION FILED NOV. 10, 1902.
NO MODEL. 2 SHEETS—SHEET 1.
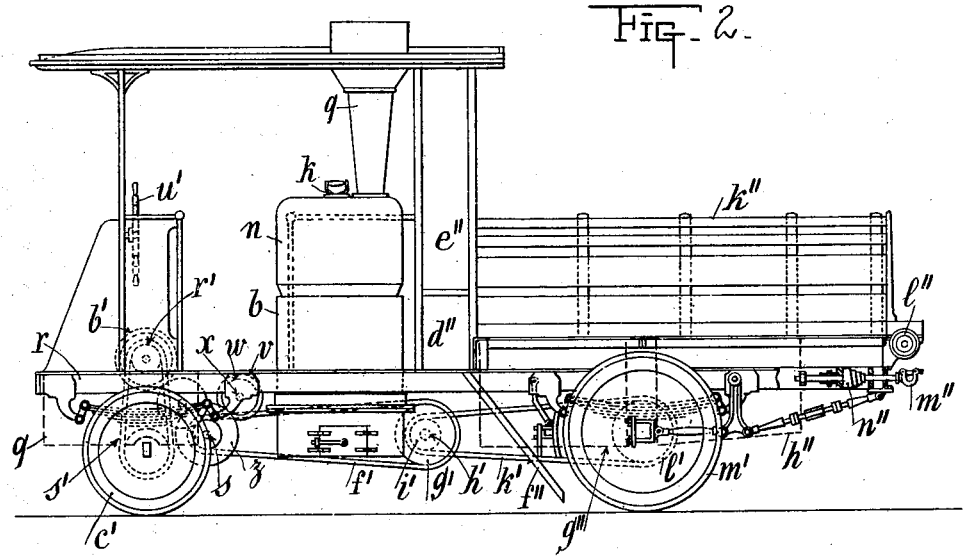
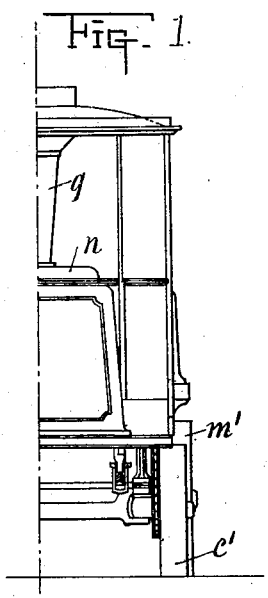 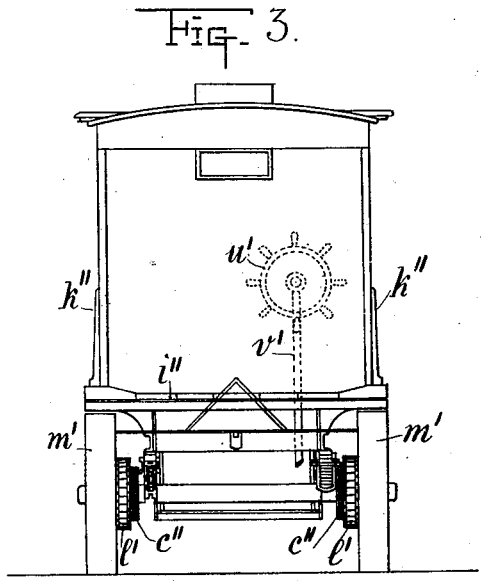

No. 734,084. PATENTED JULY 21, 1903.
C. J. OLLAGNIER.
AUTOMOTOR CARRIAGE.
APPLICATION FILED NOV. 10, 1902.
NO MODEL. 2 SHEETS—SHEET 2.
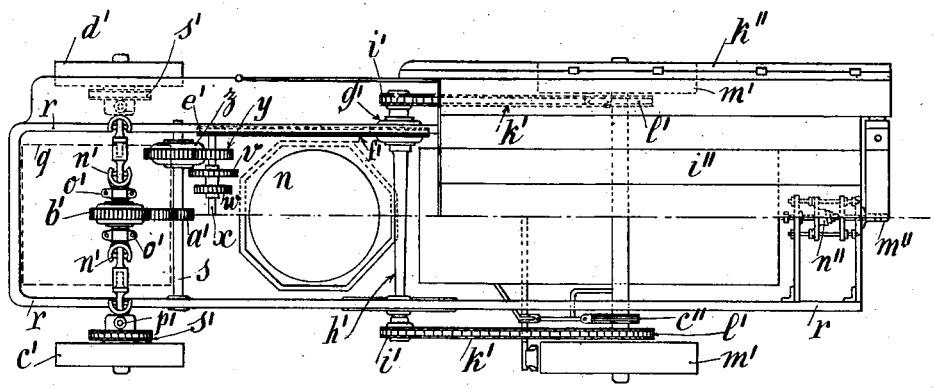
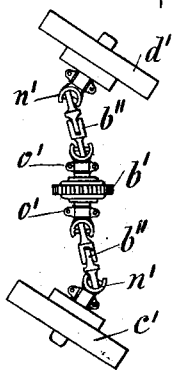
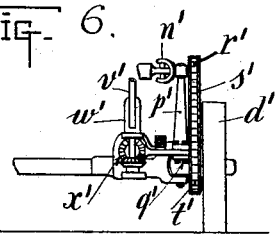
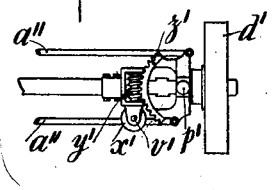
Witnesses
Thomas Kirkpatrick
H. van Heerenbrinck
Inventor
Claude Joseph Ollagnier
by Henri van Oldenneel
Attorney No. 734,084.

Patented July 21, 1903.

UNITED STATES PATENT OFFICE.

CLAUDE JOSEPH OLLAGNIER, OF PARIS, FRANCE.

AUTOMOTOR-CARRIAGE.

SPECIFICATION forming part of Letters Patent No. 734,084, dated July 21, 1903.

Application filed November 10, 1902. Serial No. 130,789. (No model.)

*To all whom it may concern:*

Be it known that I, CLAUDE JOSEPH OLLAGNIER, a citizen of the Republic of France, residing at 4 Rue Lentonnet, Paris, France, have invented new and useful Improvements in Automotor-Carriages, of which the following is a specification.

This invention consists in the application to automotor-carriages of, first, differential gear for transmitting the power of the motor to the four driving-wheels and in steering to regulate the speed of these four wheels, which are all driving-wheels, the front ones being at the same time driving and steering wheels; second, of a divided shaft with flexible joints for rendering the steering-wheels driving-wheels.

In order that the details of my invention may be understood, I have attached to this specification explanatory drawings, in which—

Figure 1 is an elevation of one-half the front of the vehicle; Fig. 2, a side view of the vehicle; Fig. 3, a back view thereof; Fig. 4, a plan. Fig. 5 represents the "Cardan" or suspended shaft. Fig. 6 is an elevation of the device for working the steering-wheels, and Fig. 7 a plan of Fig. 6.

This vehicle is distinguished by a special means for constituting all the four wheels driving-wheels, the two front wheels being for the object of increasing the cohesion, getting over obstacles, and insuring normal action, whatever the state of the roads, in connection with vehicles especially intended for the conveyance of heavy loads.

The superheated steam is conveyed from the generator $n$ into the engine, Figs. 2 and 4, placed in the front under the frame $r$. The shaft of the engine (not shown in the drawings) carries wheels which engage with the speed-change wheels $v\ w$, mounted to slide on the shaft $x$, on whose end a pinion $y$ is mounted and actuates the differential gear $z$, by means of which motion is imparted, on the one hand, to the wheel $a'$, actuating the differential gear $b'$ for working the front wheels $c'\ d'$, and, on the other hand, the tooth-rim $e'$ and the chain $f'$ of the differential gear $g'$, intended for the back wheels. The back wheels $m'$ are driven through the tooth-wheels $i'$, keyed to each end of the differential-gear shaft $g'$, and the chains $k'$, which drive the tooth-wheels $l'$, mounted on the hubs of the wheels. The band-brake $c''$ is wound on the hubs of the back wheels and causes the brake-blocks to press against the tires. This operation is effected by means of a pedal placed under the foot of the driver. The function of the differential gear $z$ is thus fully defined. It receives motion from the engine $q$, transmits it to the back and front wheels, and regulates the speed of those wheels in connection with the steering.

The differential gear $b'$, fixed in front on the frame $r$, controls the divided shaft with flexible joints $n'$, which rests on fixed supports $o'$ and the movable supports $p'$, bolted to the flats of the pivoted axle $q'$. The two ends of this axle receive toothed wheels $r'$, with which the vertical chains $s'$ are geared, and transmit motion to the toothed wheels $t'$, keyed to the hubs of the front wheels $c'\ d'$, which they actuate and which become driving-wheels.

Fig. 4 shows the position of the divided shaft with flexible joints, the vehicle running straight.

The steering is effected with the vertical hand-wheel $u'$, connected by upper pinions with the flexibly-jointed steering-rod $v'$, Figs. 3 and 6, which rises and falls according to the oscillations of the frame in the slide of the socket $w'$. At the end of this socket are lower gearings $x'$ for actuating the endless screw $y'$ and the tooth-sector $z'$, with which it engages. This sector is mounted in the flat of the right-hand axle, conveys rotary motion to the pivot-axis of the axle, and transmits it to the other wheel by means of the steering-rods $a''$.

Fig. 5 shows the position of the divided shaft and of the flexible joints $n'$, the wheels turning to their greatest possible extent. The articulations thus produced, nevertheless, are limited in consequence of the slides $b''$.

The movable supports $p'$ being fixed on the flats of the axles are actuated in the same direction as the wheels. The vertical chains do not undergo any alteration in form. They act constantly on the wheels always rendered driving and steering wheels, whatever their position may be.

Figs. 6 and 7 explain the motion of the driving-wheels.

The coke-box $e''$ is near the generator. It is closed in front by doors, leaving free access to the boiler. The back of this box or compartment is movable in the upper part, which when the loading is being effected assumes the position of an inclined plane.

The sand-compartments $d''$ are arranged on each side of the coke-compartment. They are utilized by means of the pipe-chutes $f''$. $g''$ $h''$ are feed-reservoirs, $i''$ the platform, and $k''$ the coal-trucks.

The windlass $l$ and finally the coupling $m''$, furnished with its spring $n''$, are attached in the direction of the longitudinal parts of the frame, so as to be employed for trailing vehicles.

I claim—

1. In combination in a motor road-vehicle the front wheels, each of which is independently pivoted to be adjusted about a vertical axis, a divided flexible shaft, a differential gear for driving the said divided shaft, driving means between the divided shaft and the hubs of the front wheels and extending vertically at each end of the divided shaft, the said divided shaft being supported over the axles of the front wheels to be adjusted therewith and means for adjusting the front wheels, substantially as described.

2. In combination in a motor road-vehicle, the front wheels having their axles pivotally supported, a divided flexible shaft, a differential gear for driving the said shaft, said divided shaft being arranged in a plane above the plane of the axles of the wheels, a drive-chain connection between the ends of the divided shafts and the wheel-hubs, means for adjusting the wheel-axles about their pivots and a support for the outer ends of the divided shaft extending from the journals of the pivoted axles, substantially as described.

3. In combination, a divided shaft, a differential gear at the center of the said shaft, fixed supports for the central portion of the said divided shaft, flexible joints $n'$ in said shaft, movable supports $p'$ for the ends of the flexible shaft, the wheels $c'$ $d'$, the pivoted axles $q'$ for the said wheels carrying the said movable supports $p'$, the chain-wheels $n$ on the hubs of the wheels $c'$ $d'$ and upon the ends of the flexible shaft and the chain connection between the said chain-wheels at each end of the shaft, substantially as described.

In testimony that I claim the foregoing I have hereunto set my hand this 20th day of October, 1902.

CLAUDE JOSEPH OLLAGNIER.

Witnesses:
    EDMOND LECONTEVEICH,
    EDWARD P. MACLEAN.